United States Patent
Bachelder et al.

(10) Patent No.: US 6,804,416 B1
(45) Date of Patent: Oct. 12, 2004

(54) METHOD AND SYSTEM FOR ALIGNING GEOMETRIC OBJECT MODELS WITH IMAGES

(75) Inventors: Ivan Bachelder, Newton, MA (US); Lowell Jacobson, Grafton, MA (US); Jay Negro, Arlington, MA (US); Leonid Segal, Woburn, MA (US)

(73) Assignee: Cognex Corporation, Natick, MA (US)

( * ) Notice: Subject to any disclaimer, the term of this patent is extended or adjusted under 35 U.S.C. 154(b) by 586 days.

(21) Appl. No.: 09/809,026

(22) Filed: Mar. 16, 2001

(51) Int. Cl.[7] .................................. G06K 9/32

(52) U.S. Cl. ..................... 382/294; 382/159; 345/651

(58) Field of Search ............................ 382/151, 155, 382/159, 156, 294, 295, 305, 296, 312, 289, 190; 345/441, 649, 651, 420, 653, 654, 630

(56) References Cited

U.S. PATENT DOCUMENTS

| | | | |
|---|---|---|---|
| 4,980,971 A | | 1/1991 | Bartschat et al. |
| 5,060,276 A | | 10/1991 | Morris et al. |
| 5,111,516 A | * | 5/1992 | Nakano et al. ............. 382/156 |
| 5,113,565 A | | 5/1992 | Cipolla et al. |
| 5,226,095 A | | 7/1993 | Okumura et al. |
| 5,268,999 A | * | 12/1993 | Yokoyama .................. 345/441 |
| 5,343,028 A | | 8/1994 | Figarella et al. |
| 5,371,690 A | | 12/1994 | Engel et al. |
| 5,471,541 A | | 11/1995 | Burtnyk et al. |
| 5,495,537 A | | 2/1996 | Bedrosian et al. |
| 5,497,451 A | | 3/1996 | Holmes |
| 5,500,906 A | | 3/1996 | Picard et al. |
| 5,545,887 A | | 8/1996 | Smith et al. |
| 5,602,937 A | | 2/1997 | Bedrosian et al. |
| 5,621,807 A | | 4/1997 | Eibert et al. |
| 5,625,715 A | | 4/1997 | Trew et al. |
| 5,627,912 A | | 5/1997 | Matsumoto |
| 5,627,915 A | | 5/1997 | Rosser et al. |
| 5,663,809 A | | 9/1997 | Miyaza et al. |
| 5,828,769 A | | 10/1998 | Burns |
| 5,850,469 A | | 12/1998 | Martin et al. |
| 5,974,169 A | | 10/1999 | Bachelder |
| 6,078,700 A | | 6/2000 | Sarachik |
| 6,151,406 A | | 11/2000 | Chang et al. |
| 6,324,298 B1 | * | 11/2001 | O'Dell et al. ............... 382/149 |
| 6,421,458 B2 | * | 7/2002 | Michael et al. ............. 382/151 |
| 6,462,751 B1 | * | 10/2002 | Felser et al. ................ 345/619 |

OTHER PUBLICATIONS

Cognex Corporation, Cognex 3000/4000/5000 Vision Tool, Revision 7.6, Chapter 4, Caliper Tool, 1996.
Cognex Corporation, Cognex 3000/4000/5000 Vision Tool, Revision 7.6, Chapter 5, Inspection, 1996.
Cognex Corporation, Cognex 4000/5000 SMD Placement Guidance Package, User's Manual Release 3.8.00, Chapter 7, Rectilinear Device Inspection, 1998.
Cognex Corporation, Cognex 4000/5000 SMD Placement Guidance Package, User's Manual Release 3.8.00, Chapter 8, Large–Leaded Device Inspection, 1998.
Cognex Corporation, Cognex 4000/5000 SMD Placement Guidance Package, User's Manual Release 3.8.00, Chapter 15, MFOV–LL Device Inspection, 1998.
Cognex Corporation, Cognex 3000/4400 SMD Tools Release 5.2, SMD 2, 1994.

(List continued on next page.)

*Primary Examiner*—Kanji Patel
(74) *Attorney, Agent, or Firm*—Russ Weinzimmer

(57) ABSTRACT

A method and system is provided for aligning a geometric object model with a pixel image. A geometric object model representing an object is obtained first. Using the geometric object model of the object, a revised geometric object model is created. An alignment tool is then trained based on the revised geometric object model. The alignment model can be applied to a pixel image of the object so that the pose of the object can be computed by aligning the revised geometric object model with the image.

25 Claims, 9 Drawing Sheets

OTHER PUBLICATIONS

Timothy S. Newman, Anil K. Jain and H.R. Keshavan, 3D CAD–Based Inspection I: Coarse Verification, pp. 49–52, IEEE, 1992.

Anthony Hoogs and Ruzena Bajcsy, Model–based Learning of Segmentations, pp. 494–499, IEEE, 1996.

Shimon Ullman, Aligning pictorial descriptions: An approach to object recognition, Cognition, vol. 32, No. 3, pp. 193–254, Aug. 1989.

Cognex Corporation, Cognex MVS–8000 Series, GDE User's Guide, Revision 1.1, Apr. 7, 2000.

Andre Fischer, Thomas Kolbe and Felicitas Lang, *On the Use of Geometric and Semantic Models for Component–Based Building Reconstruction*: Institue for Photogrammetry, University of Bonn, pp. 101–119, 1999.

George Vosselman, *Interactive Aligment of Parameterised Object Models to Images*: Delft University of Technology, Faculty of Civil Engineering and Geosciences, 1998.

D.W. Jacobs, *The Use of Grouping in Visual Object Recognition*, MIT Artifical Intelligence Laboratory, Office of Naval Research, pp. 1–162, Oct. 1988.

* cited by examiner

METHOD AND SYSTEM FOR ALIGNING GEOMETRIC OBJECT MODELS WITH IMAGES

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

BACKGROUND

1. Field of the Invention

The present invention, in certain respects, relates to the field of machine vision. In other respects, the present invention relates to a method and system that aligns a geometric object model with an image.

2. Description of Background Information

Various machine vision systems perform alignment as a first step for various tasks. For example, a machine vision inspection system will identify the correct alignment of an object before the object appearing in an image is inspected. Another example is that a robot aligns its field of view before it decides the direction in which to proceed and identifies those what obstacles to avoid. Such alignment often requires training based on an image of the object to be recognized, together with, for instance, a specification of the origin of the object as well as the dimension information of the object. While such image based training for alignment can be effective, there are certain situations where it is impractical.

Training an alignment tool based on object images is tedious and time consuming. This becomes especially a problem for manufacturing processes, where there may be a wide variety of products or objects that need to be inspected using machine vision inspection. Furthermore, product designs may frequently change. Even a minor revision to an object, for example, its shape, may require retraining.

Parameterized geometric object models may be used, instead of using object images, to train machine vision inspection systems. For purposes of the disclosure herein, a geometric model of an object comprises parameter representations of the geometry of the object. For example, parameterized geometric models are created and employed in machine vision inspection systems when aligning fiducial marks on electronic components. For a simple object, its geometric model may be created by manually entering the shape and dimension information about the object. For more complicated objects, however, creating a geometric object model may be even more difficult than training using images. That is, the complexity associated with creating a geometric model for a complicated object may outweigh the advantage of using a geometric object model for training an alignment tool.

SUMMARY OF THE INVENTION

There is a need to make direct use of available geometric object models for alignment purposes in machine vision systems so that the training process can be more efficient and such trained alignment tools can effectively align a geometric object model with an image.

The present invention is provided to improve upon techniques for obtaining a geometric object model used in a machine vision application and for performing alignment with such models. Improved methods and features are presented that address the need identified above and provide methods and apparatuses for aligning an object model with an image. Aspects of the present invention can improve both the efficiency of a training phase as well as the effectiveness of an on-line alignment phase. Existing geometric object models, such as CAD models, are utilized directly but revised with respect to the needs for alignment. A revised geometric object model is constructed especially for alignment purpose. It retains only the geometric features, selected from the original geometric object model, that are considered salient and useful with respect to the underlying task of aligning a geometric object model with an image. An alignment tool can be trained based on a revised geometric object model. Both a revised geometric object model and its correspondingly trained alignment tool may be further refined using the feedback information from an on-line alignment operation so that the revised model and the corresponding alignment tool can be adjusted to better fit the real scenarios of different machine vision applications.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

A variety of geometric object models are available in CAD format. Accordingly, geometric object model information available from CAD data may be used to train an alignment tool. This approach is beneficial for manufacturing applications where CAD models are often established during the design phase and used in other phases of the manufacturing process.

A CAD model encodes the physical features of an object. Examples of such physical features include a 90 degree angle between two lines or a circular planar with certain radius and certain orientation. Such a CAD model may, e.g., be represented in DXF format. While such features are well defined in the space they physically appear, they are not necessarily apparent in a visual image of the object. For instance, a 90 degree angle between two straight lines of an object does not necessarily appear to be a 90 degree angle in an image of the two lines. The degree of the angle between the two lines seen in their image depends on the perspective of the object in the image. As another example, a physically circular planar may appear to be an oval-shaped object in its image. That is, a CAD model sometimes may not be suitable for machine vision applications because it may not directly provide what is needed for training an alignment tool.

A method and apparatus is described below that directly utilizes an existing geometric model of an object to train an alignment tool for the object and that applies the trained alignment tool to determine the pose, which includes the position and the orientation, of the object in an image. For example, the method and apparatus can take a CAD model for a chair, as input, to train an alignment tool that can be used to align the CAD model with the chair appearing in a two dimensional image or 2D image and to determine the pose (position and orientation) of the chair in the image based on the alignment. Particularly, the method and apparatus described below allows a user to rapidly filter, via one of or a combination of tools, for example, manual, graphical, and automatic tools, those features of an existing geometric model description that are salient and useful with respect to alignment.

Figure 1:
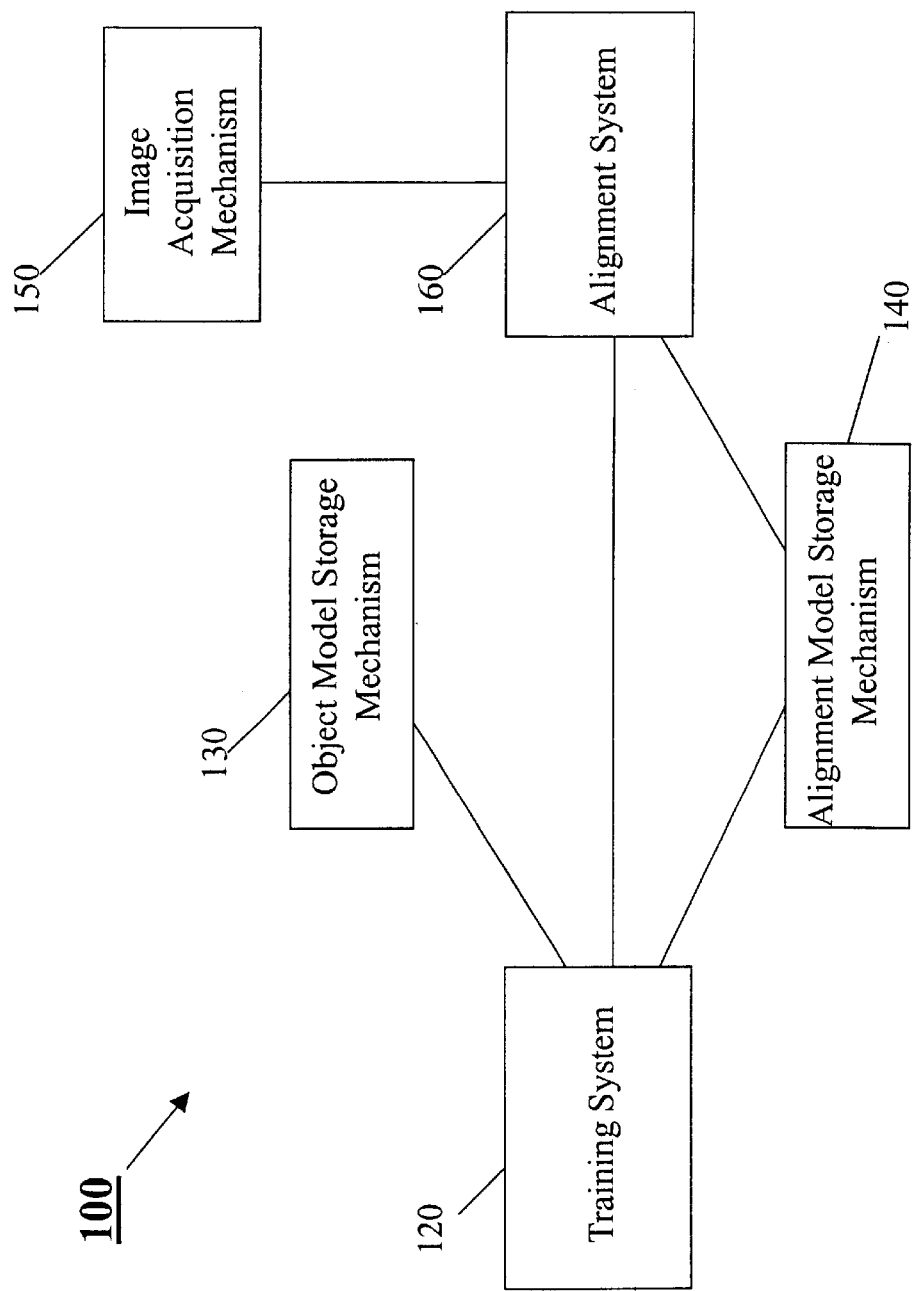
FIG. 1 shows a high level block diagram of an illustrative embodiment of a system that aligns an image with a geometric model using an alignment tool trained using existing geometric object models.
Figure 3A:
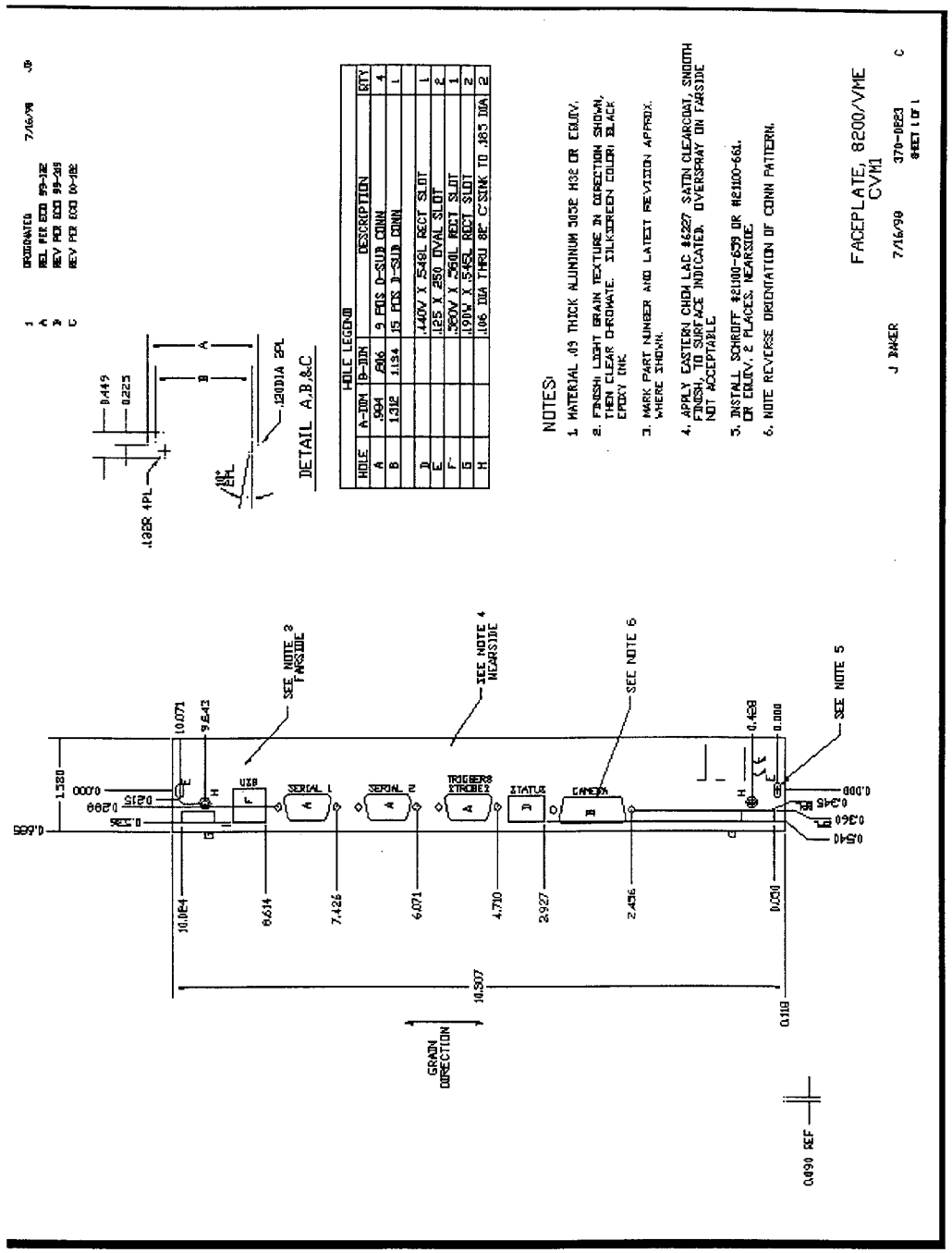
FIG. 3A shows an exemplary CAD model for an electronics enclosure face plate.

FIG. 1 shows a high level block diagram of a geometric model based alignment system 100. The illustrated system 100 comprises an object model storage mechanism 130, a training system 120, an alignment tool storage mechanism 140, an image acquisition system 150, and an alignment system 160. In system 100, an existing geometric object model (e.g., a CAD model for a face plate, as illustrated in FIG. 3A), stored in object model storage mechanism 130, can be retrieved and used by training system 120 to train an alignment tool. An alignment tool trained by training system 120 is stored in alignment tool storage mechanism 140. The correspondence between geometric object models, stored in object model storage mechanism 130, and alignment tools, stored in alignment tool storage mechanism 140, may be established using some identification scheme. Such a trained alignment can be retrieved, from alignment tool storage mechanism 140, and used by alignment system 160 to align an image of an object, acquired by image acquisition system 150, with a geometric object model of the object, retrieved from object model storage mechanism 130.

Figure 5:
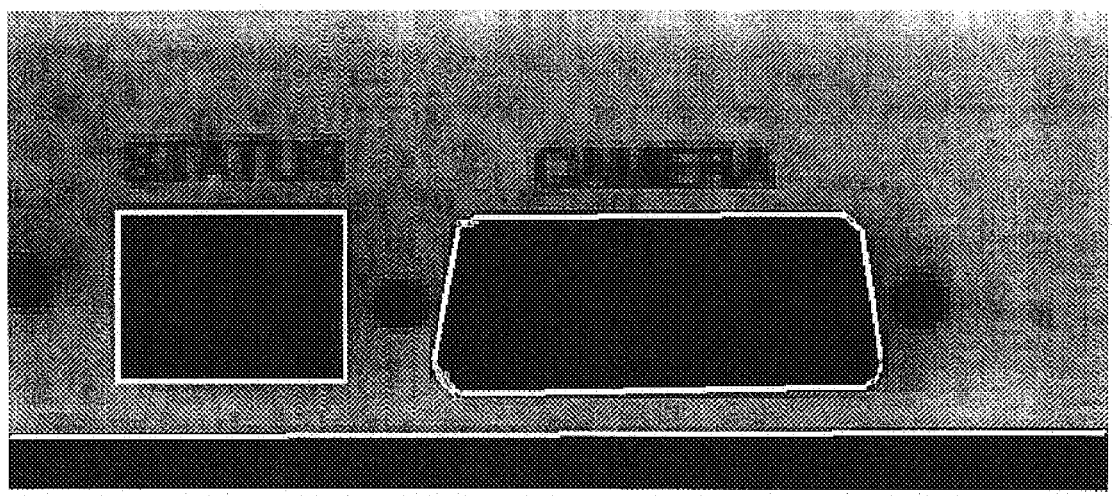
FIG. 5 shows an exemplary set of functional geometric elements chosen from a set of geometric elements converted from the illustrated CAD model.

Training system 120, in system 100, may revise the existing geometric object model to produce a revised geometric object model that may better facilitate the alignment of the revised object model with an image of the underlying object (e.g., removing parts of a 3D CAD model that will not be visible in an image of the object). For example, FIG. 5 illustrates a revised object model of the CAD model shown in FIG. 3A. The geometric features retained in the revised model, displayed in FIG. 5, may be chosen from the geometric features, displayed in FIG. 3A, according to the usefulness of those features for alignment purposes.

Once it is generated, the revised geometric object model is stored in object model storage mechanism 130. Based on the revised object model, training system 120 then trains an alignment tool for aligning the revised model with an image of the underlying object and stores the trained tool in alignment tool storage mechanism 140. The correspondence between the revised object model and the accordingly trained alignment tool may be established through some identification scheme. During alignment, the alignment tool, trained based on a revised object model, can be used, in combination with the use of the revised object model, by alignment system 160 to align the revised object model with an image of the underlying object.

A machine vision system that performs alignment may comprise two phases: an off-line training phase and an on-line alignment phase. In an off-line training phase, alignment models are trained. In an on-line alignment phase, trained alignment models are applied to align images with object models. In FIG. 1, training system 120, together with object model storage mechanism 130 and alignment model storage mechanism 140 forms an off-line training phase. Alignment system 160, together with image acquisition system 150, object model storage mechanism, and alignment model storage mechanism 140 forms an alignment phase. An alignment model is generated in an off-line training phase and used in an on-line alignment phase. There is an additional feedback connection, in system 100, from the on-line alignment phase to off-line training phase (via the link between alignment system 160 and training system 120). With this feedback, training system 120 may further refine a revised object model as well as its corresponding alignment model based on the alignment performance, fed back from alignment system 160.

In FIG. 1, object model storage mechanism 130 stores and retrieves object models. Object model storage mechanism 130 may reside at more than one site, connected by, for example, a network. Each site may store geometric models for different objects on a different type of medium, may employ different management scheme, and may retrieve stored object models in a different manner.

Geometric object models stored in object model storage mechanism 130 may include CAD models that encode the physical features of various objects. Additionally, object model storage mechanism 130 may include other types of geometric object models that may encode different kinds of geometric features of various objects. A particular kind, for example, may be a revised CAD model that, although still a geometric object model, may describe those geometric features that are visible in a 2D image. For example, a CAD model for a watch may encode the physical features on both the front and the back of the watch. When the watch is imaged, for example in 2D space, in its frontal view, the physical features on the back of the watch will not be visible in the 2D image. In this case, a revised model for the watch that retains only the physical features corresponding to the front of the watch may be derived, from the original CAD model, to produce a revised geometric model for the watch that may be practically more useful, especially for aligning a 2D image.

A revised object model simplifies the original geometric model. It also explicitly defines geometric features seen in the object image, and it can be revised so as to more accurately represent a given geometric feature of the object itself, e.g., the object's image inaccurately depicts the given feature. This information is very useful in training an alignment tool because it eliminates the unnecessary burden associated with those geometric features that are actually not relevant to the alignment. Therefore, a revised object model usually leads to a more effective alignment model.

In FIG. 1, to train an alignment tool, training system 120 first retrieves an existing geometric object model for an object, such as a CAD models, from object model storage mechanism 130. From the existing geometric object model, training system 120 derives a revised geometric object model and then trains an alignment model for the underlying object based on the revised geometric object model. The revised object model may be stored in object model storage mechanism 130 and the alignment model may be stored in alignment model storage mechanism 140, respectively. The correspondence between the revised object model and the alignment model may be established. The revised object model may also be stored together with the alignment model.

Since the revised object model may describe what geometric feature should be seen in an image of the object, the alignment model for the object may be trained accordingly to detect those geometric features from a pixel image of the object and to then use those features detected from an image to match with the corresponding geometric features in the revised object model so that the object image and the object model can be aligned. The pose of the object in the pixel image may also be automatically computed once the alignment is achieved.

The revised models and alignment models for alignment, generated and trained off-line by training system 120, are stored for their future use in an on-line alignment phase.

During the process of alignment, a 2D image for an object, on which alignment is to be performed, is first acquired by image acquisition system 150. Taking the 2D image as an input, alignment system 160 retrieves the alignment model, trained for the object during the off-line training phase, from alignment tool storage mechanism 140. Alignment system 160 then performs the alignment and computes the pose of the object in the input image.

Alignment system 160 may also generate some alignment performance related information. Such performance related information may be later used by training system 120 to refine a previously generated revised object model and subsequently to retrain the alignment model that is trained using the previously generated revised object model. This is a feedback interaction between the off-line training system 120 and the alignment system 160. The need for refining both the revised object model and the corresponding alignment tool may arise due to different reasons. For example, it is possible that some of the geometric features described in a revised object model as visible in an image may consistently not be detected from an image by alignment system 160, due to, for example, the poor lighting condition in the image. In this case, it may be desirable to remove these geometric features from the revised object model and then re-train an alignment tool, corresponding to the refined model, that does not attempt to detect these features during alignment.

Figure 2:
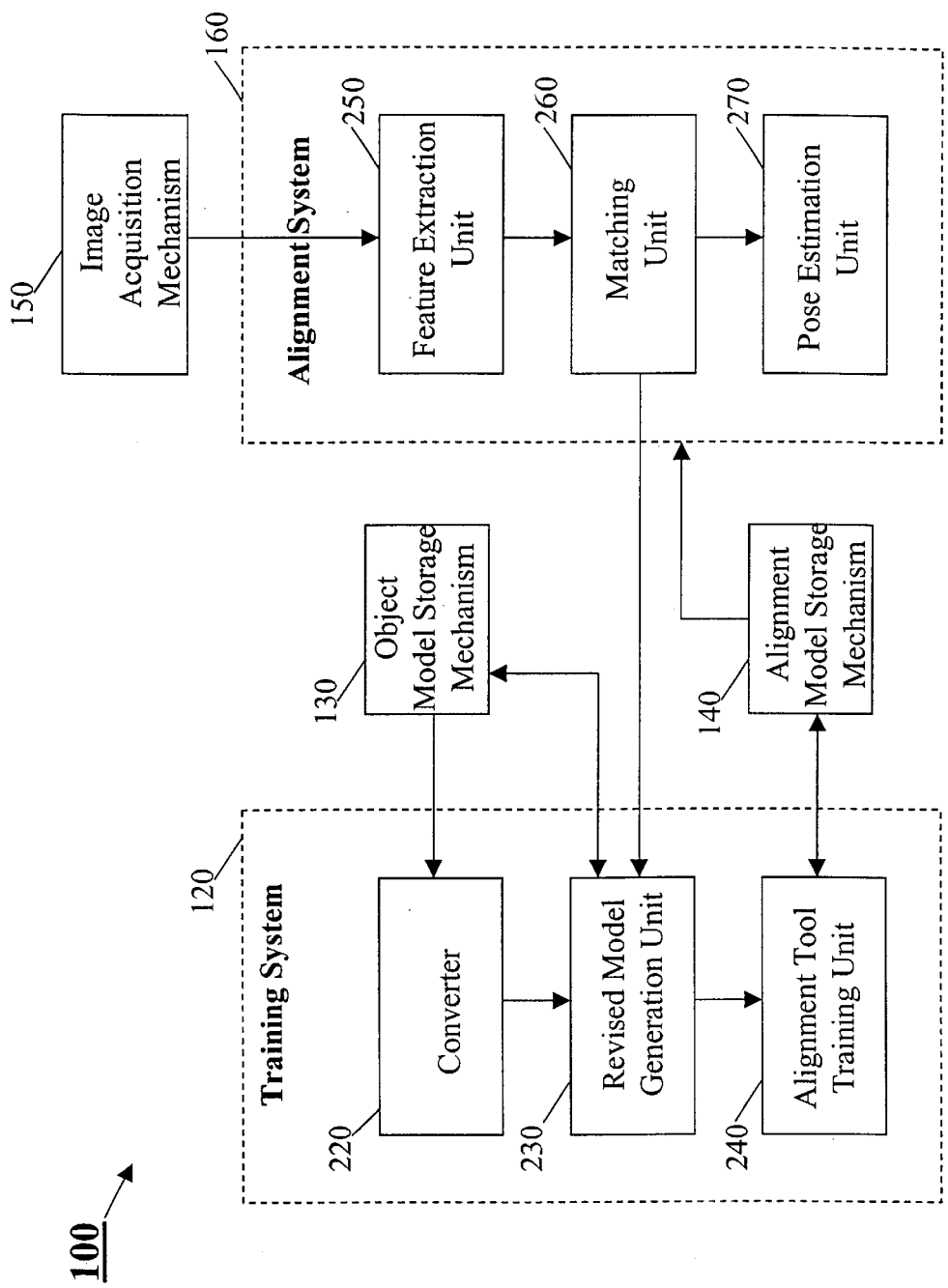
FIG. 2 shows a more detailed block diagram of an embodiment of the present invention.
Figure 3B:
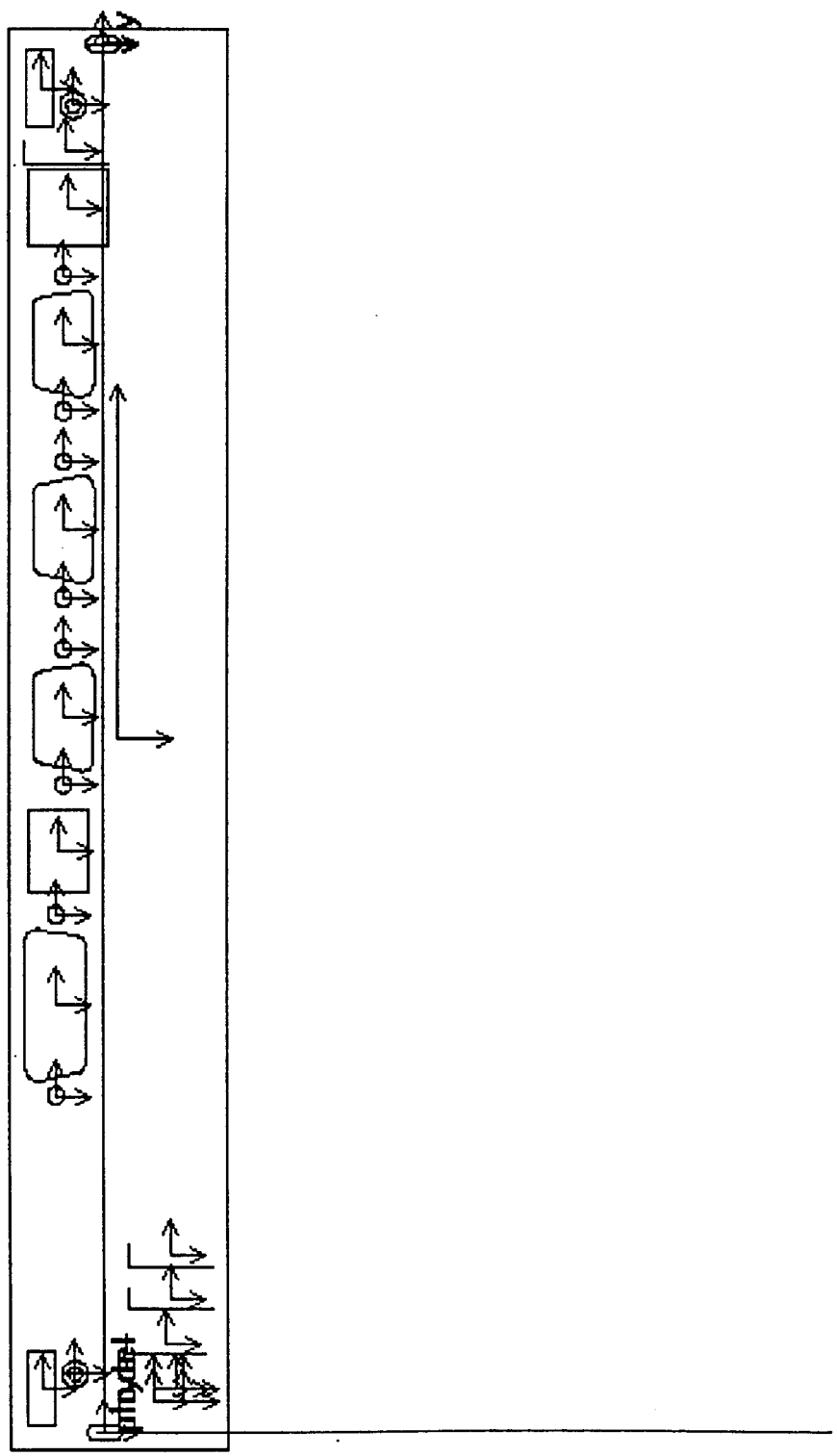
FIG. 3B shows an image of exemplary geometric elements converted from the CAD model illustrated in FIG. 3A.

FIG. 2 shows a more detailed block diagram of system 100, in which both training system 120 and alignment system 160 comprise more components. Training system 120 may include a converter 220 that converts a set of physical features described in a geometric object model into a corresponding set of geometric elements (GEs). Examples of GEs include lines or arcs. FIG. 3A shows an example of a nominal CAD model for a face place, rendered in a 2D image. The nominal CAD model, shown in FIG. 3A, can be converted to a set of GEs (e.g., arcs and lines). FIG. 3B shows a rendered image of the GEs converted from the nominal CAD model shown in FIG. 3A.

Based on the GEs converted by converter 220, a revised model generation unit 230 creates a revised model of the object, which may be defined by, for example, a set of salient geometric elements (SGEs). An SGE of an object is a GE of the object that satisfies some criteria. Examples of such criteria include the visibility of a GE in an image of the object or whether the GE can be detected from an image. The SGEs may also be chosen, manually by a user, according to some subjective criteria. For example, a user may select SGEs based on how relevant or effective a GE is in terms of alignment. A user may consider that a curve in alignment is more useful than a straight line. In this case, the user may select only the GEs that represent curves as SGEs. Yet another example is the degree of effectiveness of a GE in alignment. For instance, a longer straight line may be considered more effective than a short straight line because a longer straight line may constrain the alignment more effectively. In this case, a GE that represents a very long straight line may be more likely selected as an SGE.

Revised model generation unit 230 creates a revised object model, via different means, including, for example, manual, graphical, automatic, or a combination of these approaches. A revised object model, once created, is stored in object model storage mechanism 130.

Using a revised object model, alignment training unit 240 trains an alignment model for the corresponding object. The training may be achieved using different approaches. One example of such approaches is to train, based on a synthetic image rendered from the SGEs, a search model or a rotation-scale invariant search method. Another alternative is to directly train a rotation-scale invariant search method by synthesizing the geometric search features from SGEs. Such a trained alignment model is then stored in alignment tool storage mechanism 140 for future use. Before the alignment model is trained, features are converted from physical unites (e.g., microns) to image pixels or fractions thereof. A viewer/editor 221 may be provided to allow a user to view and edit any one of the representations in the training system.

On the right side of FIG. 2, alignment system 160 performs alignment between a revised object model and an image of the corresponding object, by applying an alignment tool trained for the object. To do so, alignment system 160 first obtains an image of the object from image acquisition mechanism 150 and then retrieves the alignment tool, that has been trained for the particular object, from alignment tool storage mechanism 140.

The alignment process may comprise different tasks. Alignment system 160 may comprise individual system components that perform those distinctly different tasks. In FIG. 2, alignment system 160 comprises a feature extraction unit 250, a matching unit 260, and a pose estimation unit 270. Their functionalities are described below.

Based on an input image for an object, feature extraction unit 250 detects a set of image features, from the input image, that correspond to the SGEs specified in the revised geometric model of the object. To compute the pose of the object in the input image, it is necessary to align the image features, detected from the input image, with the SGEs, specified in the revised object model. It should be noted that these two feature sets may or may not have equal number of elements, depending on whether all the SGEs can be detected from the input image. As discussed earlier, it is possible that some of the SGEs may not be detected from the input image due to reasons such as poor illumination of the image.

Matching unit 260 aligns the two feature sets by matching each image feature with its corresponding SGE. The matching operation generates pairs of image feature and its corresponding SGE. Based on these pairs produced by matching unit 260, pose estimation unit 270 computes the pose of the object.

Figure 4:
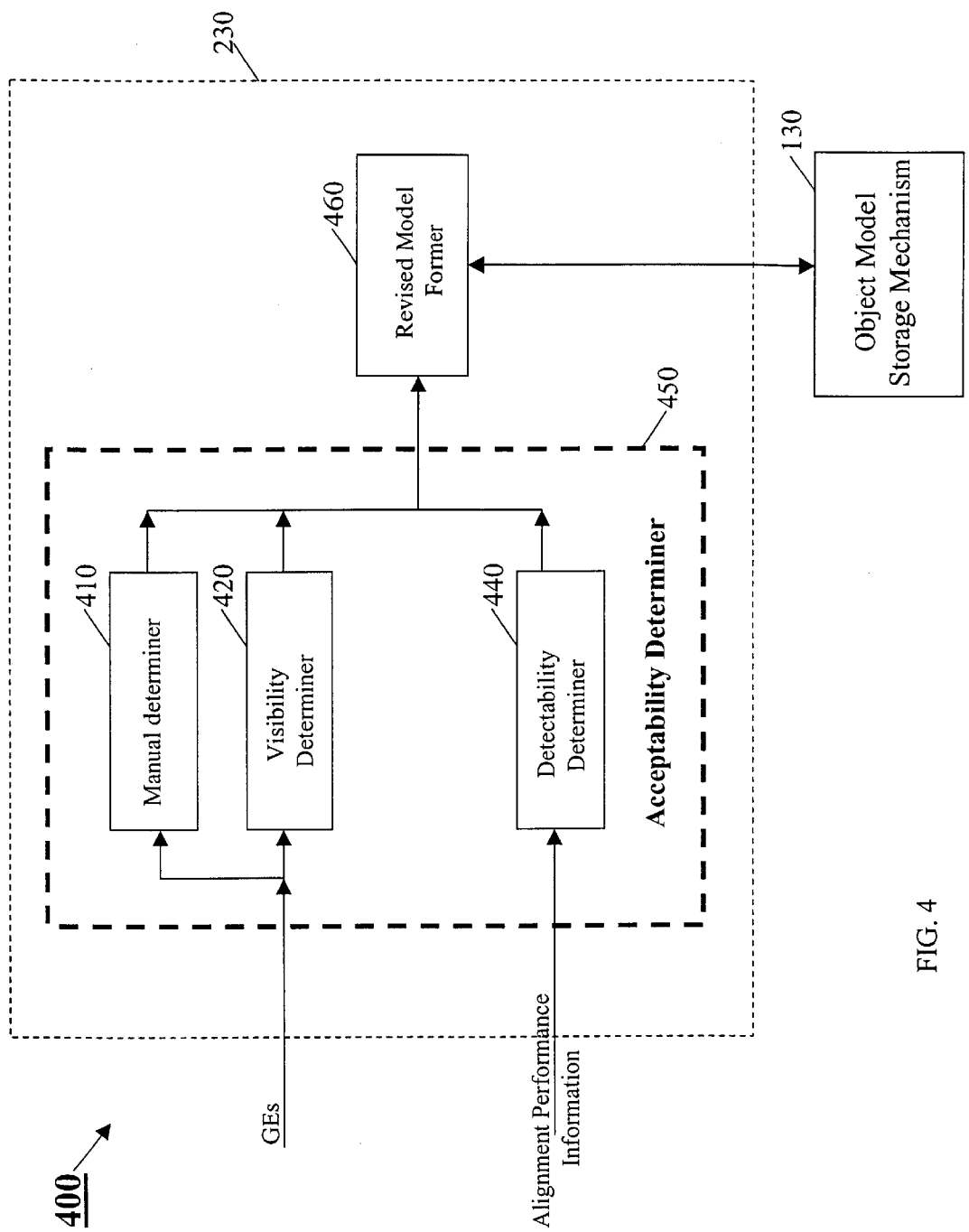
FIG. 4 is a block diagram for an embodiment of the present invention, in which the a set of functional geometric elements are selected from a set of geometric elements.

As mentioned earlier, SGEs, generated by revised model generation unit 230, correspond to GEs that satisfy some criteria. FIG. 4 illustrates an exemplary mechanism 400 to select SGEs. An acceptability determiner 450 determines whether each of the GEs, generated by converter 220, will be accepted as a SGE. The SGEs selected by acceptability determiner 450 are fed to revised model former 460 to construct a revised object model. The revised model is then saved in object model storage mechanism 130. FIG. 5 shows an exemplary revised object model derived based on the set of GEs shown in FIG. 3B. The exemplary revised object model is illustrated, in FIG. 5, as rendered SGEs in a 2D image.

In the exemplary embodiment illustrated in FIG. 4, there are four determiners, 410, 420, 430, and 440, each of which may determine the acceptability of a GE according to one single criterion.

Visibility determiner 420 automatically decides the acceptability of a GE by examining whether it is visible in an image. For example, whether a GE is visible in a 2D image may be automatically determined once the perspective of the object is known.

Detectability determiner 440 decides whether a GE is actually detectable from an image. Different from previously described determiners in FIG. 4, determiner 440 may take the alignment performance information generated by an alignment tool as input. The performance information may record the geometric features that have not been detected in the previous alignment operations. Using such information, determiner 440 may retrieve the corresponding revised object model and refine it so that the SGEs that have not been detected can be removed from the revised object model to produce a refined revised model for the object. Accordingly, the alignment tool previously trained for this particular object may also be refined based on the refined model.

Manual determiner 410 is a mechanism, which allows a user to manually select SGEs from a set of GEs. The manual selection may be based on the subjective evaluation of the GEs with respect to a set of criteria, which may include any individual, any combination of the exemplary criteria discussed so far. For example, a user may select a GE as a SGE because the GE is not only visible but also non-occluded and detectable. The manual selection of SGEs may be accomplished through a graphical interface. For instance, an image that contains rendered GEs may be displayed in a window of the graphical interface. An interactive tool may be active in the display window that allows a user to select SGEs by simply clicking on the corresponding GEs.

Figure 6:
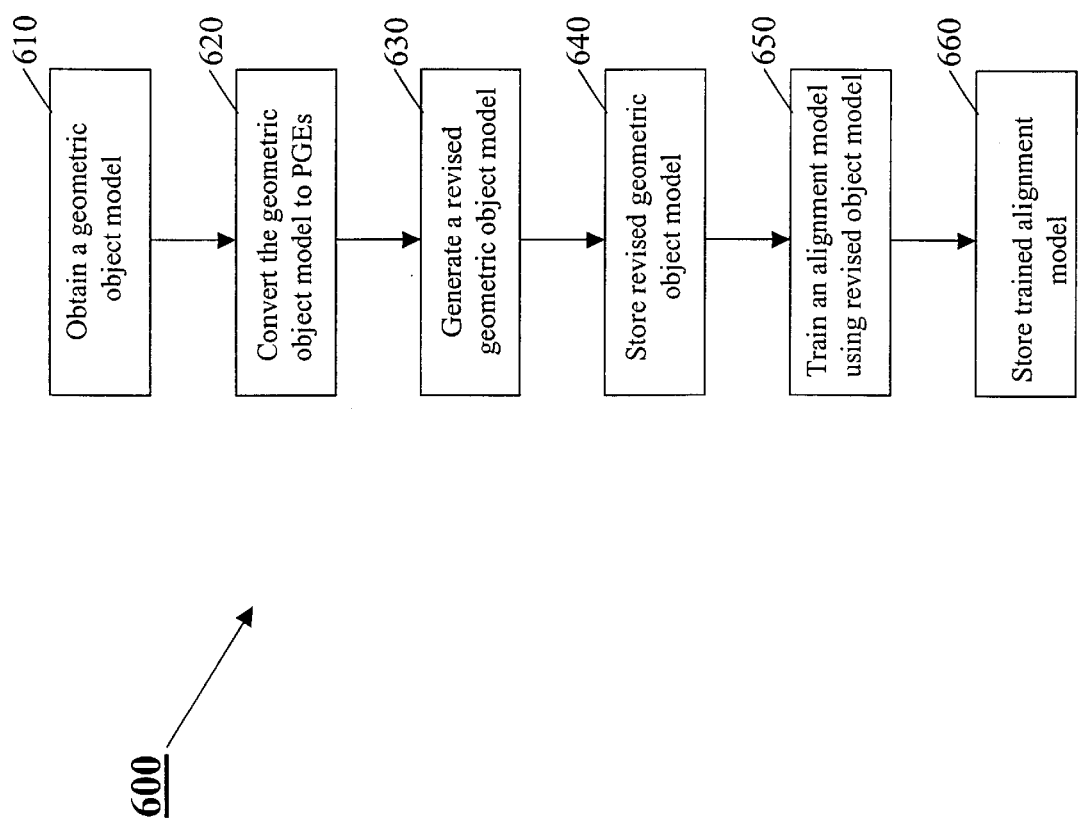
FIG. 6 is a flowchart of an embodiment of the present invention, in which an alignment model is trained based on a geometric object model.

FIG. 6 is a flowchart of the training phase of the present invention. An existing geometric object model is first obtained at act 610. The model is retrieved from object model storage mechanism 130 for the purpose of training an alignment model. The geometric object model is then converted to a set of GEs at act 620. Based on the set of GEs, a set of SGEs are selected and used to construct a revised object model at act 630. Once generated, the revised object model is stored at act 640 in object model storage mechanism 130 and is used to train an alignment model for the object at act 650. Such trained alignment model for the object is then stored at act 660 in alignment model storage mechanism 140 for its use during on-line alignment phase.

Figure 7:
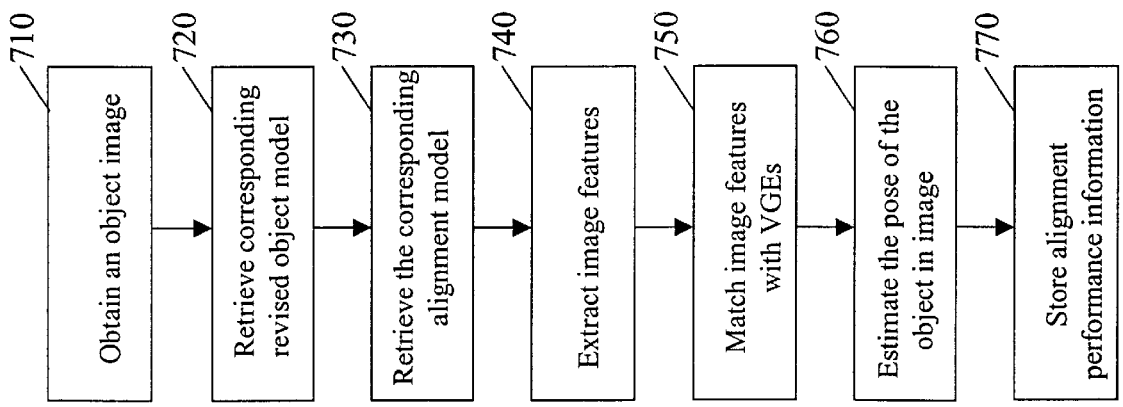
FIG. 7 is a flowchart of an embodiment of the present invention, in which a revised geometric object model and its corresponding alignment tool are used in on-line alignment.

FIG. 7 shows a flowchart of an exemplary alignment phase of the present invention. An image for an object is acquired at act 710. To estimate the pose of the object from the image, the first step is to align a revised geometric model of the object with the image, using an alignment model previously trained for the object. Therefore, the revised geometric model for the object is retrieved at act 720 and an alignment tool trained for the same object is retrieved at act 730. Using the alignment model, a set of image features corresponding to the set of SGEs in the model are extracted at act 740.

The image features extracted at act 740 are then matched, at act 750, with corresponding SGEs from the revised object model. The pairs of matched image features and SGEs will then be used, at act 760, to compute the pose of the object in the image.

Figure 8:
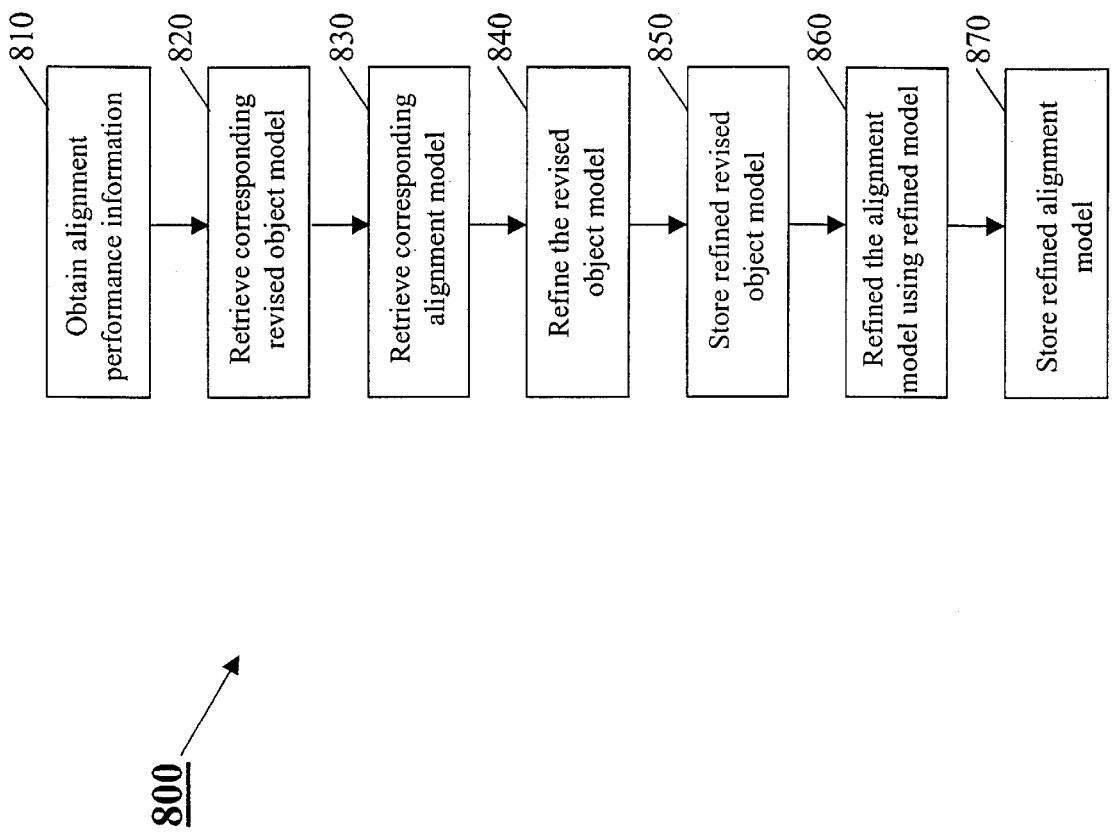
FIG. 8 is a flowchart of an embodiment of the present invention, in which a revised geometric object model and its corresponding alignment tool may be further refined based the feedback information from the on-line alignment performance.

As discussed earlier, in referring to FIG. 2, there may be a feedback interaction between the on-line alignment system 160 and the training system 120. As depicted in FIG. 7, the on-line alignment process may store, at act 770, the alignment performance information. Such information may describe which SGEs are not detected so that the training system 120 may be activated later to refine the revised object model and the corresponding alignment model 1 for the object based on that information. An exemplary flowchart of the refinement process of the present invention is shown in FIG. 8.

The alignment performance information is obtained, by training unit 120, at act 810. A previously generated revised object model, associated with the obtained alignment performance information, is retrieved at act 820 from object model storage mechanism 130. Accordingly, the alignment model, previously trained based on the retrieved revised object model, is retrieved at act 830 from alignment model storage mechanism 140. Using the alignment performance information, the previously generated revised object model is refined at act 840 and stored back to object model storage mechanism 130 at act 850 to replace the previous revised object model.

If the alignment performance information describes a set of SGEs that the previously trained alignment model has not been able to detect from images during on-line alignment, such SGEs may be removed from the refined model. Based on the refined object model, the retrieved alignment model, that has been previously trained using previously generated revised object model, is refined or re-trained at act 860. The refined alignment model is stored back at act 870 in alignment tool storage mechanism 140 in place of the previously trained alignment model.

The processing described above may be performed by a general-purpose computer alone or in connection with a specialized image processing computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for aligning a geometric object model with a pixel image, said method comprising:

obtaining a geometric object model representing an object;

converting the geometric object model into a set of geometric elements;

selecting from the set of geometric elements a set of salient geometric elements by determining the acceptability of each of said geometric elements according to at least one criterion;

creating a revised geometric object model using the set of salient geometric elements;

training at least one alignment model based on the revised geometric object model;

acquiring a pixel image object representation; and aligning said revised geometric object model with said pixel image object representation using said at least one alignment model.

2. The method of claim 1, wherein obtaining a geometric object model includes obtaining a CAD model, and wherein converting the geometric object model into a set of geometric elements includes removing parts of the CAD model.

3. The method of claim 1, wherein said converting the geometric object model into a set of geometric elements includes converting the geometric object model into a set of lines.

4. The method of claim 1, wherein said converting the geometric object model into a set of geometric elements includes converting the geometric object model into a set of arcs.

5. The method of claim 1, wherein said geometric elements comprise circular and elliptical arcs and lines.

6. The method of claim 1, wherein the at least one criterion includes:

visibility of a geometric element in said pixel image object representation.

7. The method of claim 1, wherein the the at least one criterion includes:

non-occlusion of a geometric element in said pixel image object representation.

8. The method of claim 1, wherein the at least one criterion includes:

detectability of geometric element in said pixel image object representation.

9. The method of claim 1, wherein the at least one criterion includes whether a geometric elements is selected by a human operator using a graphical interface.

10. The method of claim 1, wherein said aligning includes:

extracting a set of image features from said pixel image representation of said object, each of said image features corresponding to a different salient geometric element included in said revised geometric object model;

matching said set of image features with corresponding salient geometric elements included in said revised geometric object model to produce a set of matched pairs between said set of image features and said corresponding salient geometric elements included in said revised geometric object model; and estimating the pose of said object in said pixel image representation based on said set of matched pairs.

11. The method of claim 10, wherein matching said set of image features with corresponding salient geometric elements included in said revised geometric object model includes:

generating alignment performance information.

12. The method of claim 1, wherein aligning includes generating alignment performance information, and the method further includes:

using the alignment performance information and the revised object model to create a further revised geometric object model having a different set of geometric elements; and using the further revised geometric object model to create a revised alignment model.

13. The method of claim 12, wherein using the alignment performance information to create a further revised geometric object model having a different set of geometric elements includes:

using the alignment performance information to remove geometric elements from the revised object model.

14. The method of claim 13, wherein using the alignment performance information to remove geometric elements from the revised object model includes:

removing geometric elements that are not adequately detected in an image during alignment.

15. A system for estimating the pose of an object in a pixel image, said system comprising:

a storage mechanism storing at least one geometric object model;

a converter to convert the at least one geometric object model to a set of geometric elements;

a selector to select a set of salient geometric elements from the set of geometric elements, the selector having a determiner to determine the acceptability of each of said geometric elements according to at least one criterion so as to provide the set of salient geometric elements;

a revised geometric object model builder to build a revised geometric object model using the set of salient geometric elements;

a training unit to train at least one alignment tool based on the revised geometric object model;

an image acquisition mechanism to obtain a pixel image object representation; and an alignment system to align said revised geometric object model with said pixel image object representation using said at least one alignment tool.

16. The system of claim 15, wherein said geometric object model includes a CAD model, and wherein the converter converts the geometric object model into a set of geometric elements be removing parts of the CAD model.

17. The system of claim 15, wherein said at least one criterion includes the visibility of said geometric elements in said pixel image representation.

18. The system of claim 15, wherein said at least one criterion includes the non-occlusiveness of said geometric elements in said pixel image representation.

19. The system of claim 15, wherein said at least one criterion includes the detectability of said geometric elements in said pixel image representation.

20. The system of claim 15, wherein said at least one criterion includes whether said geometric elements are selected by a human operator through a graphical editor.

21. The system of claim 15, wherein said alignment system includes:
   an extractor to extract a set of image features from said pixel image representation of said object, each of said image features corresponding to a different salient geometric element included in said revised geometric object model;
   a matcher to match said set of image features with corresponding salient geometric elements included in said revised geometric object model to produce a set of matched pairs between said set of image features and said corresponding salient geometric elements included in said revised geometric object model; and
   an estimator to estimate the pose of said object in said pixel image representation based on said set of matched pairs.

22. The system of claim 21, wherein the matcher provides feedback information to the selector regarding geometric elements in the revised geometric object model that have not adequately matched to said set of image features.

23. The system of claim 15, wherein the alignment system provides feedback information to the selector regarding geometric elements in the revised geometric object model that have not adequately matched to said set of image features.

24. A medium having information recorded thereon, such that when said information is read and executed by a computer, the computer is caused to:
   obtain a geometric object model representing an object;
   convert the geometric object model into a set of geometric elements;
   select from the set of geometric elements a set of salient geometric elements by determining the acceptability of each of said geometric elements according to at least one criterion;
   create a revised geometric object model using the set of salient geometric elements;
   train at least one alignment model based on the revised geometric object model;
   acquire a pixel image object representation; and
   align said revised geometric object model with said pixel image object representation using said at least one alignment model.

25. The medium of claim 24, wherein said information recorded on said medium further causing said computer to:
   extract a set of image features from said pixel image representation of said object, each of said image features corresponding to a different salient geometric element included in said revised geometric object model;
   match said set of image features with corresponding salient geometric elements included in said revised geometric object model to produce a set of matched pairs between said set of image features and said corresponding salient geometric elements included in said revised geometric object model; and
   estimate the pose of said object in said pixel image representation based on said set of matched pairs.

* * * * *

(12) INTER PARTES REEXAMINATION CERTIFICATE (535th)
United States Patent
Bachelder et al.

(10) Number: US 6,804,416 C1
(45) Certificate Issued: Feb. 20, 2013

(54) METHOD AND SYSTEM FOR ALIGNING GEOMETRIC OBJECT MODELS WITH IMAGES

(75) Inventors: Ivan Bachelder, Newton, MA (US); Lowell Jacobson, Grafton, MA (US); Jay Negro, Arlington, MA (US); Leonid Segal, Woburn, MA (US)

(73) Assignee: Cognex Corporation, Natick, MA (US)

Reexamination Request:
No. 95/001,174, Apr. 24, 2009

Reexamination Certificate for:
Patent No.: 6,804,416
Issued: Oct. 12, 2004
Appl. No.: 09/809,026
Filed: Mar. 16, 2001

(51) Int. Cl.
*G06K 9/32* (2006.01)

(52) U.S. Cl. .................. 382/294; 382/159; 345/651

(58) Field of Classification Search .................. None
See application file for complete search history.

(56) References Cited

To view the complete listing of prior art documents cited during the proceeding for Reexamination Control Number 95/001,174, please refer to the USPTO's public Patent Application Information Retrieval (PAIR) system under the Display References tab.

*Primary Examiner* — Colin Larose

(57) ABSTRACT

A method and system is provided for aligning a geometric object model with a pixel image. A geometric object model representing an object is obtained first. Using the geometric object model of the object, a revised geometric object model is created. An alignment tool is then trained based on the revised geometric object model. The alignment model can be applied to a pixel image of the object so that the pose of the object can be computed by aligning the revised geometric object model with the image.

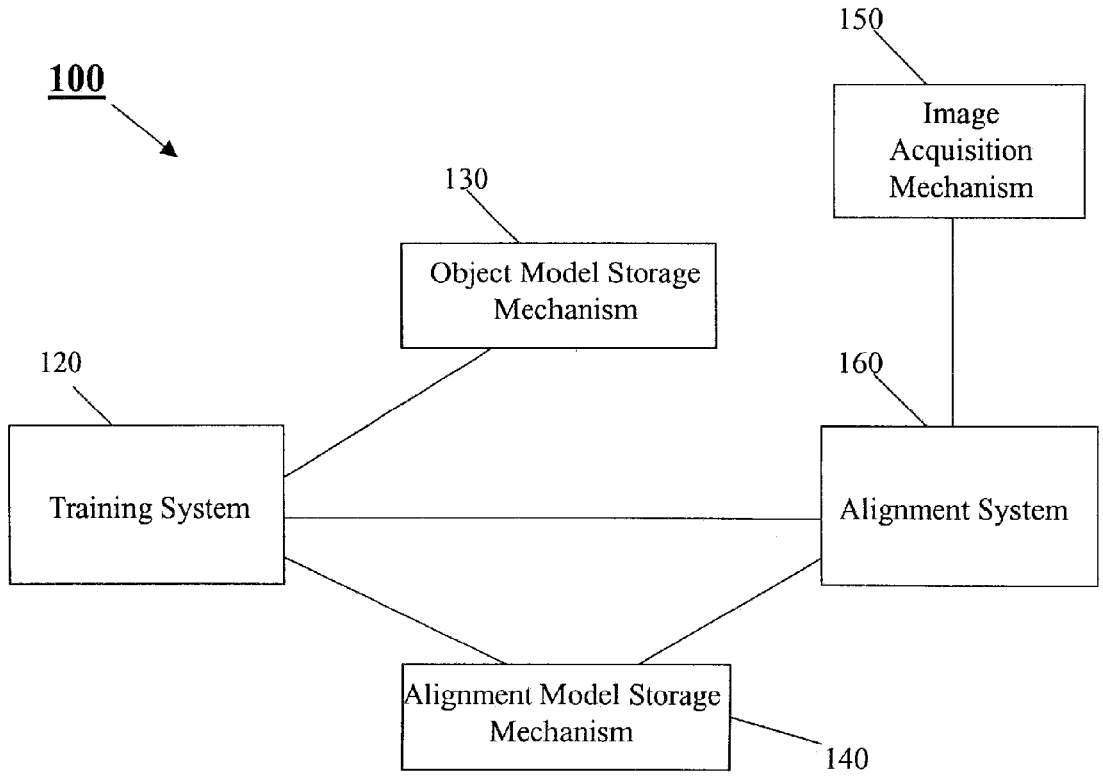

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-25 are cancelled.

* * * * *